Nov. 29, 1966    V. A. WILHELM ET AL    3,289,006
DIFFERENTIAL DIRECT CURRENT VOLTAGE LIMITER
Filed June 12, 1963    2 Sheets-Sheet 1

INVENTORS
DONALD GABIN
VINCENT A. WILHELM
BY Herbert C. Davis
ATTORNEY

Nov. 29, 1966 V. A. WILHELM ETAL 3,289,006
DIFFERENTIAL DIRECT CURRENT VOLTAGE LIMITER
Filed June 12, 1963 2 Sheets-Sheet 2

INVENTORS
DONALD GABIN
VINCENT A. WILHELM
BY *Herbert L. Davis*
ATTORNEY 3,289,006
DIFFERENTIAL DIRECT CURRENT VOLTAGE LIMITER
Vincent A. Wilhelm, Mahwah, and Donald Gabin, Teaneck, N.J., assignors to The Bendix Corporation, Teterboro, N.J., a corporation of Delaware
Filed June 12, 1963, Ser. No. 287,403
13 Claims. (Cl. 307—24)

This invention relates to a differential direct current voltage limiter, and more particularly to a direct current limiting circuit for use with a three-wire differential output circuit.

In present direct current limiting circuits designed for use with a three-wire differential output circuit, the signal is constantly attenuated even before the desired limiting value is reached. A large number of components are also necessary in the present limiting circuits as substantially a separate limiter circuit is utilized for each outer leg.

The invention contemplates three-wire electrical conductors having inputs for receiving eelctrical differential signals and outputs leading to two control elements to which said differential signals may be applied, a diode bridge network connected across said electrical inputs and outputs, means included in said bridge network having a substantially constant threshold potential below which it is non-conductive and above which it is conductive and a substantially constant impedance when conductive for limiting the voltages applied through said three-wire electrical inputs to said outputs, switching means in said bridge network provided for selectively shunting a portion of the input signals through the bridge network so as to limit the difference between the signal voltages at the outputs as well as limit the maximum voltage across the control elements.

It is an object of the invention to provide a direct current voltage limiter for use with a three-wire differential circuit wherein no signal attenuation occurs below the desired limiting level.

It is another object of the invention to provide novel means for limiting the maximum differential between the voltages applied across a pair of control windings as well as limit the maximum voltage applied across either of the control windings.

It is another object of the invention to provide a direct current voltage limiter wherein switching means is utilized to effectively connect and disconnect the limiter circuit from a three-wire differential circuit.

It is still another object of the invention to provide a direct current voltage limiter wherein the one limiting means is used for both the outer legs of the three-wire differential circuit.

A further object of the invention is to provide a direct current limiting circuit providing sharp limiting characteristics.

The foregoing and other objects and advantages of the invention will appear more fully hereinafter from a consideration of the detailed description which follows, taken together with the accompanying drawings wherein one embodiment of the invention is illustrated by way of example. It is to be understood, however, that the drawings are for the purpose of illustration only and are not to be construed as defining the limits of the invention.

Figure 1:
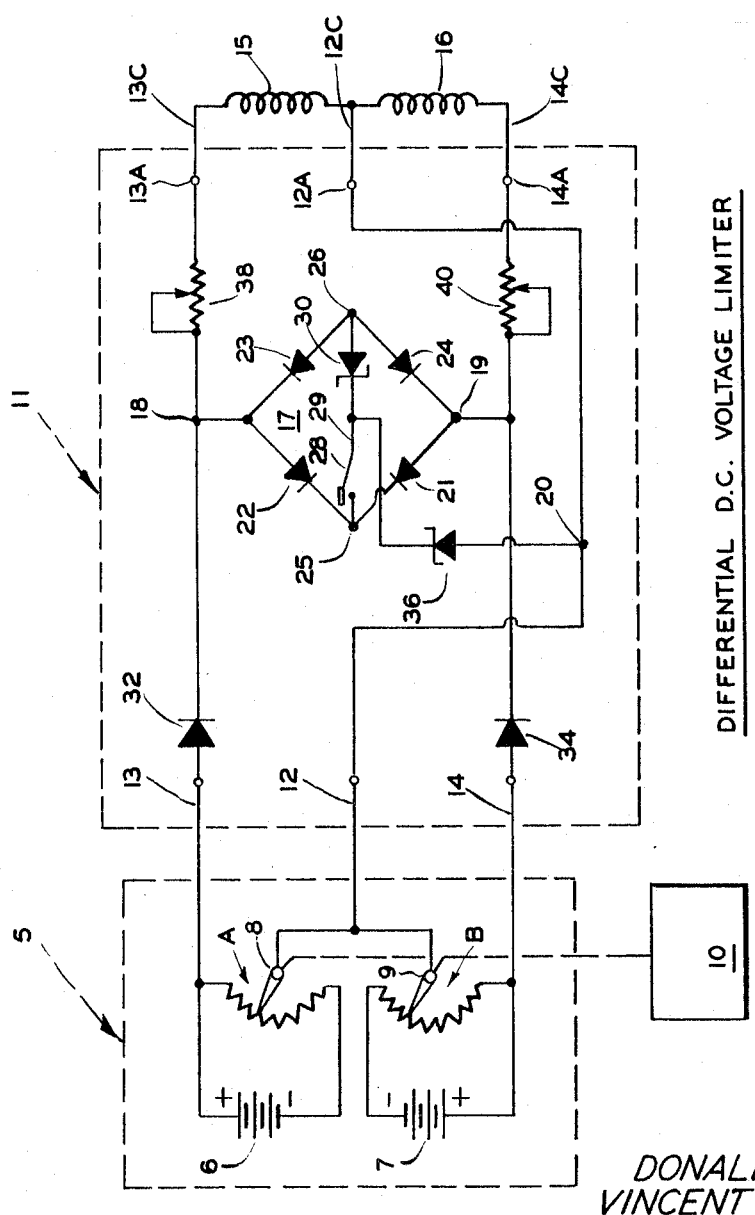
FIGURE 1 is a schematic diagram of a differential direct current voltage limiter embodying the invention.

Referring to the drawing of FIGURE 1, there is shown a three-wire differential signal voltage source 5 of conventional type and shown herein schematically by way of example as including a first direct current voltage source 6 and a second direct current voltage source 7. Connected across the voltage sources 6 and 7 there may be provided potentiometers A and B having adjustable arms 8 and 9 thereof electrically connected to a common output line 12 bearing a negative charge relative to output lines 13 and 14 leading from the positive terminals of the respective voltage sources 6 and 7.

Figure 2:
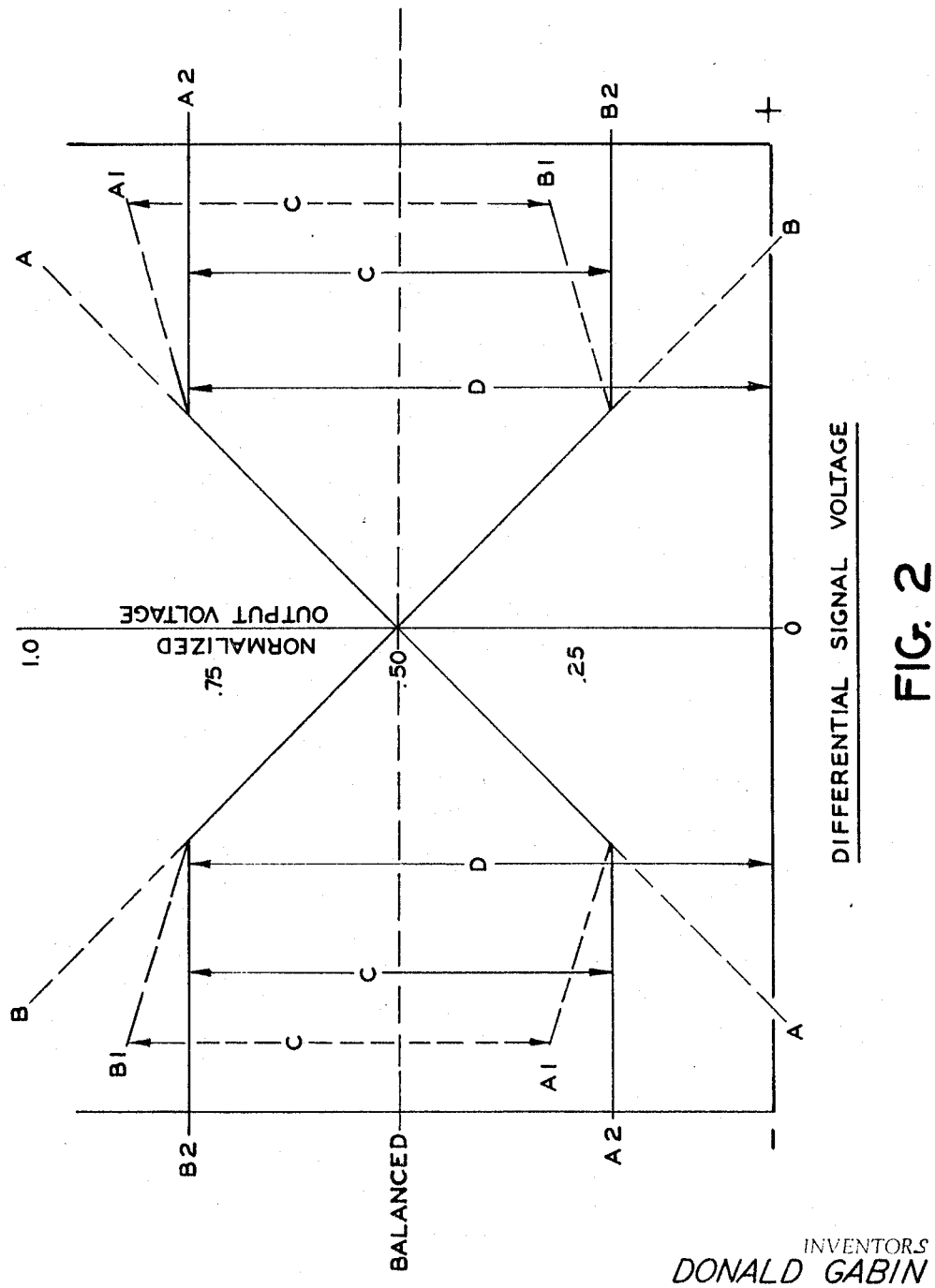
FIGURE 2 is a graph illustrating the operation of the differential direct current voltage limiter of FIGURE 1.

The adjustable arms 8 and 9 of the potentiometers A and B may be operated in unison by a suitable condition responsive mechanism or other suitable control device 10 so as to increase the signal voltage applied by the one potentiometer and decrease the signal voltage applied by the other potentiometer upon the control deviating from a null or zero signal position in positive and negative senses, as indicated graphically in FIGURE 2.

Thus, upon the control device 10 being adjusted from the zero position in a positive sense, the potentiometer A will be so adjusted in response to the operation of the control device 10 as to increase the voltage applied across the line 12 and 13, as indicated to the right of FIGURE 2 by the line A, while the potentiometer B will be so adjusted in response to such operation of the control device 8 as to decrease the voltage applied across the lines 12 and 14, as indicated to the right of FIGURE 2 by the line B.

However, upon the control device 8 being adjusted from the zero position in an opposite or negative sense, the potentiometer A will be so adjusted in response to such operation of the control device 8 as to decrease the voltage applied across the lines 12 and 13, as indicated to the left of FIGURE 2 by the line A while the potentiometer B will be so adjusted in response to such operation of the control device 8 as to increase the voltage applied across the lines 12 and 14, as indicated to the left of FIGURE 2 by the line B.

However, in order to limit the maximum differential between the voltages represented by the lines A and B of FIGURE 2 to a predetermined value indicated graphically in FIGURE 2 by the arrows C and also limit the maximum D.C. voltage represented by the lines A and B of FIGURE 2 to a predetermined value indicated graphically in FIGURE 2 by the arrows D, there has been provided the novel D.C. voltage limiter indicated generally by the numeral 11 in FIGURE 1, and hereinafter explained in greater detail.

Referring then to the drawing of FIGURE 1, the three-wire differenital signal source 5 of a suitable type may be electrically connected to the differential direct current voltage limiter 11 through the common output line 12 bearing a negative charge and the two positive output potential lines or legs 13 and 14.

The lines 12, 13, and 14 lead through the differential direct current voltage limiter 11 to corresponding output terminals 12A, 13A, and 14A, which are in turn electrically connected by corresponding electrical output conductors 12C, 13C, and 14C to two control elements 15 and 16 which may be control windings of a magnetic amplifier of conventional type. Thus, the control element 15 is operatively connected by the conductors 12 and 13 across the direct current variable voltage source 6 while the control element 16 is operatively connected by the electrical conductors 12 and 14 across the direct current variable voltage source 7.

The differential direct current D.C. voltage limiter 11 includes a bridge network 17 shunted across the electrical conductors 12 and 13 and electrical conductors 12 and 14. Thus the bridge network 17 has terminals 18, 19, and 20 operatively connected to the lines 13, 14, and 12 respectively, as hereinafter explained.

Further, provided in the bridge network 17 are diode devices 21, 22, 23, and 24 having unidirectional current characteristics and so arranged in the bridge network 17 as to provide first, second, third, and fourth arms, respectively, of the bridge network. In the bridge network 17, the diode devices 21 and 22 are so arranged as to be conductive of current flow from lines 13 and 14 to a terminal 25 between the first and second arms of the bridge network while preventing a current flow in a reverse direction from the terminal 25 to the lines 13 and 14, respectively. The diode devices 23 and 24 are so arranged as to be conductive of current flow to the lines 13 and 14, respectively, from the terminal 26 between the third and fourth arms of the bridge network 17 while preventing a current flow in a reverse direction from the lines 13 and 14 to the terminal 26.

A single operator-operative contact switch 28 is connected by a conductor 29 in a series with a Zener diode 30 between the terminal 25 and the terminal 26. Diodes 32 and 34 are connected in the lines 13 and 14 as to prevent reverse current flow to the differential signal source 5.

The bridge terminal 20 is operatively connected through a second Zener diode 36 to the conductor 29 between the switch 28 and the Zener diode 30.

Such Zener diodes are of a type having a unique reverse breakdown characteristic which permits conduction in the back direction when voltages exceeding certain values are applied. Moreover, each Zener diode in the reverse or back direction has a substantially constant threshold potential below which it is nonconductive and above which it is conductive and a substantially constant impedance when conductive.

The Zener diode 30 is so arranged as to prevent current flow from terminal 25 to the terminal 26 until the difference between the voltages applied across the lines 12 and 13 and the lines 12 and 14 exceeds a maximum value determined by the selection of the Zener diode 30.

The Zener diode 36 is so arranged as to prevent current flow from the line 29 to the line 20 until the voltages applied across either the lines 12 and 13 or the lines 12 and 14 exceeds a predetermined maximum value determined by the selection of the Zener diode 36.

The Zener diode 36 may be so selected as to come into operation at about the same time as the Zener diode 30. Thus, as shown graphically in FIGURE 2, the Zener diode 30 serves to limit the difference between the voltages represented by the lines A–B to the values indicated by lines A–1 and B–1, as indicated by the arrows C, while upon the Zener diode 36 coming into limiting operation, the maximum voltage value of the lines A and B, as indicated by the arrows D, is further limited to the value indicated by the lines A–2 and B–2 at the right-and-left-hand sides respectively of the graph of FIGURE 2.

Further, as shown in FIGURE 1, a single control switch 28 serves to effectively remove or connect the limit circuit 17 from or to the control circuit. When the switch 28 is closed, the limiter bridge network 17 is operatively connected across the lines 12 and 13 and 12 and 14.

When the signal control switch 28 is closed, there will still be no current flow in the bridge network 17 until the differential limiting value of the Zener diode 30 is reached. Thus, as indicated at the right of the graph of FIGURE 2, an increase in the difference between the voltage signals up to and beyond the differential limiting value will cause Zener diode 30 to become so conductive as to then allow, upon the signal voltage indicated by the line A being greater than voltage B, sufficient current flow from line 13 through diode 22, switch 28, Zener diode 30, diode 24 to line 14 so as to maintain the constant limited differential voltage indicated by the arrow C at the right of FIGURE 2; or the differential voltage indicated by the arrow C at the left of FIGURE 2 by a current flow from line 14 through diode 21, switch 28, Zener diode 30, diode 23 to line 13 upon the voltage indicated by the line B of the graph of FIGURE 2 being greater than the voltage indicated by the line A.

Moreover, upon the signal voltage applied across either the lines 12 and 13 or the lines 12 and 14 exceeding the limiting value of the Zener diode 36, the Zener diode 36 will become so conductive as to then allow, upon the signal voltage indicated by the line A exceeding such value, a sufficient current flow from line 13 through diode 22, switch 28, Zener diode 36 to line 12 so as to limit the voltage to the preset value indicated by the arrows D at the right of FIGURE 2, or to the value indicated by the arrows D at the left of FIGURE 2 by a current flow from line 14 through diode 21, switch 28, Zener diode 36 to line 12 upon the signal voltage indicated by the line B exceeding such value.

The value of the limited differential voltage is equal then to the sum of the threshold voltages of diodes 22 and 24 or 21 and 23 plus the value of Zener diode 30 selected to provide the desired results while the maximum voltage value is equal to the sum of the threshold voltages of diode 21 or 22 plus the value of Zener diode 36 selected to provide the desired results. By using the bridge network 17, it will be observed that the differential signal source 5 may have either polarity and by reversing the connections of diodes 32 and 34 an input signal on lines 13 and 14 of negative polarity may be used.

Thus, the diode bridge 17 provides a single Zener diode 30 to limit the differential voltage and a single Zener diode 36 to limit the maximum voltage to both control elements 15 and 16. The limiting effect being applied to whichever control element 15 or 16 has the increasing voltage applied to it. When the differential signal source to be applied is of negative polarity, the switch 28 and Zener diode 36 are interchanged and the connections of the Zener diode 36 as well as those of diodes 32 and 34 are reversed.

When the exact value of Zener diode 30 desired is not readily available, variable resistors 38 and 40 may be inserted in the outer legs or lines 13 and 14, respectively, and varied to obtain the required differential voltage limit. The insertion of the variable resistors 38 and 40 is preferably avoided, however, as they may cause attenuation during unlimited operation.

The novel circuit described provides a highly reliable differential direct current voltage limiter requiring a minimum of components but possessing sharp limiting characteristics and an absence of signal attenuation below the desired limiting level.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. For use with a source of differential signal voltage, a differential direct current voltage limiter comprising a three-wire electrical input for receiving differential voltage signals from said source a three-wire electrical output from said limiter, two control elements to which said differential voltage signals may be applied through said output, a bridge network connected to said input and said output, first means in said bridge network having a substantially constant threshold potential below which it is nonconductive and above which it is conductive and a substantially constant impedance when conductive for cooperating with said bridge network so as to limit to a predetermined maximum differential value the voltages applied through said output to said control elements, second means included in said bridge network having a substantially constant threshold potential below which it is nonconductive and above which it is conductive and a substantially constant impedance when conductive for cooperating with said first means and said bridge network to limit the voltages applied through said output to said control elements to a predetermined maximum value and within a range determined by said predetermined maximum differential value.

2. The combination defined by claim 1 including a single switch member in said bridge network operable in one sense for simultaneously applying the signal voltages to the first and second limiting means in the bridge network, and said switch member being operable in another sense for simultaneously disconnecting said first and second limiting means from said cooperative relation in said bridge network.

3. For use with a source of differential signal voltages, a differential direct current voltage limiter comprising electrical input conductors for receiving differential voltage signals from said source output conductors to which said differential voltage signals may be applied,
the bridge network including four arms including two pairs of diagonal terminals for the bridge network,
each terminal of one pair of said diagonal terminals being connected to one of said input and output conductors,
a device having a unidirectional current characteristic connected in each of said arms,
one pair of said devices being conductive of current flow from said one pair of diagonal terminals to one of the terminals of the other pair of said diagonal terminals,
the other pair of said devices being nonconductive of current flow from said one pair of diagonal terminals to another of the terminals of the other pair of said diagonal terminals,
a first electrical current flow control means,
a second electrical current flow control means operably connected to another of said input and output conductors,
each of said control means having a substantially constant threshold potential below which it is nonconductive and above which it is conductive and a substantially constant impedance when conductive,
a single contact switch connected in series with said first control means and operable in one sense to selectively connect the first control means across the other pair of said diagonal terminals and in cooperative relation with said bridge network to limit the voltage signals applied to said output conductors to a predetermined maximum differential value,
said single contact switch being connected in series with said second control means and operable in said one sense to selectively connect said second control means to said one terminal of the other pair of diagonal terminals and in cooperative relation with said bridge network to limit the voltage signals applied across said output conductors to a predetermined maximum value,
and said single contact switch being operable in another sense for effectively disconnecting the first and second control means from said cooperative relation with said bridge network.

4. For use with a source of differential signal voltages, a differential direct current voltage limiter comprising a three-wire input for receiving differential signals from said signal source, and one of said wires being a common wire input for said signal voltages, an output comprising two control elements to which said differential signal voltages may be applied,
a bridge network including four arms connected between said input and said output,
a device having a unidirectional current conduction characteristic connected in each of said arms,
control means having a substantially constant threshold potential below which it is nonconductive and above which it is conductive and a substantially constant impedance when conductive,
and means connecting said control means between a terminal of the bridge and the common wire input to limit the maximum voltage across both of said control elements.

5. For use which a source of differential signal voltages, a differential direct current voltage limiter comprising a three-wire input for receiving differential voltage signals from said source, and one of said wires being a common input wire for said signal voltages an output comprising two control elements to which said differential voltage signal may be applied,
a bridge network connected to said input and said output including four arms,
a device having a unidirectional current conduction characteristic connected in each of the arms,
a single contact switch selectively operable in said bridge for effectively connecting and disconnecting a terminal of said bridge from said one common wire input,
means limiting the maximum voltage across both of said control elements having a substantially constant threshold potential below which it is nonconductive and above which it is conductive and a substantially constant impedance when conductive,
and means connecting said limiting means between said one wire of the three-wires of said input and said single contact switch.

6. For use with a source of differential voltages, a differential direct current voltage limiter comprising a three-wire input for receiving differential voltage signals from said source, and one of said wires being a common wire input for said signal voltages an output comprising two control elements to which said differential voltage signal may be applied,
a diode bridge connected to said input and said output,
and a Zener diode for limiting the maximum voltage across both control elements connected from said one wire of the three wires of said input to a terminal of the bridge.

7. For use with a source of differential signal voltages, a differential direct current voltage limiter comprising a three-wire input for receiving differential signal voltages from said source, and one of said wires being a common input wire for said signal voltages an output comprising two control elements to which said differential signal voltages may be applied through said three-wire input,
a diode bridge network connected to said input and said output,
a single contact switch in said bridge network for effectively disconnecting said bridge from said input,
a first Zener diode in series with said switch and connected through said switch across diagonal terminals of the bridge network in such a manner as to cooperate with said bridge network so as to limit the voltages applied to said control elements through said three-wire input to a predetermined differential value,
and a second Zener diode in series with said switch and connected from the common wire of the input through said switch to a terminal of the bridge network in such a manner as to cooperate with said bridge network so as to limit the maximum voltage across said control elements to a predetermined value.

8. For use with a source of differential signal voltages, a differential direct current voltage limiter comprising a three-wire input for receiving differential signal voltages from said source, and one of said wires being a common input wire for said signal voltages an output including two control elements to which said differential signal voltages may be applied through said three-wire input, a diode bridge network connected to said input and said output, a first Zener diode connected across diagonal terminals of the bridge network for limiting the voltages applied to said control elements through said three-wire input to a predetermined differential value, and a second Zener diode connected from the common wire of the input to a terminal of the bridge network in such a manner as to limit the maximum voltage across said control elements to a predetermined value.

9. For use with a source of differential signal voltages, a differential direct current voltage limiter comprising a three-wire input for receiving differential signal voltages from said source, an output including two control elements to which said differential signal voltages may be applied through said three-wire input, a diode bridge network connected to said input and said output, a single contact switch in said bridge network for effectively disconnecting said bridge from said input, a Zener diode in series with said switch and connected across diagonal terminals of the bridge network for limiting the maximum differential in the signal voltages applied across the control elements, means for adjusting the differential voltage limit level, said adjusting means being located between the bridge network and said output.

10. For use with a source of differential signal voltages, a differential direct current voltage limiter comprising a three-wire input for receiving differential signal voltages from said source, an output including two control elements to which said differential signal voltages may be applied through said three-wire input, a bridge network connected to said input and said output, current control means having a substantially constant threshold potential below which it is nonconductive and above which it is conductive and a substantially constant impedance when conductive, said current control means being connected in said bridge network for limiting the voltages applied to both of said control elements through said output to a predetermined differential value, switching means in said bridge network provided for selectively applying said input signals to the current control means through the bridge network, additional means for effecting a fine adjustment of the value of the differential voltage limit applicable to both of said control elements, and said fine adjustment means being connected in the output between said bridge network and said control elements.

11. The combination comprising a source of differential voltages, a bridge network, said bridge network having electrical current input terminals for said differential voltages and output terminals for said differential voltages, a pair of control elements connected in cooperative relation with said bridge network, each of said control elements having a substantially constant threshold potential below which it is nonconductive and above which it is conductive and a substantially constant impedance when conductive, one of said control elements being operably connected in said bridge network so as to limit the differential voltages applied across the output terminals to a predetermined differential value and the other of said control elements being operably connected in said bridge network so as to limit said differential voltages to a predetermined maximum value.

12. The combination defined by claim 11 including a single switch member to operably connect and disconnect both of said control elements in said bridge network so as to selectively render said control elements effective to limit the voltages applied across the output terminals to the predetermined differential value and said voltages to the predetermined maximum value.

13. The combination comprising a source of differential voltages, a bridge network having current input terminals for said differential voltages and output terminals for said differential voltages, a first Zener diode operably connected in the bridge network so as to maintain a predetermined differential between the differential voltages applied across said output terminals, and a second Zener diode operably connected between an input terminal common to said differential voltages and the bridge network so as to limit the differential voltages applied across said output terminals to a predetermined maximum value.

References Cited by the Examiner
UNITED STATES PATENTS

| | | |
|---|---|---|
| 2,875,382 | 2/1959 | Sandin. |
| 2,965,771 | 12/1960 | Finkel. |
| 3,116,439 | 12/1963 | Riebs. |
| 3,151,289 | 9/1964 | Harpley. |
| 3,209,161 | 9/1965 | Lovci. |

OTHER REFERENCES

General Electric Selenium Thyrecton Diodes, Transient Voltage Surpressons, General Electric, 1961, p. 16.

ORIS L. RADER, *Primary Examiner.*

T. J. MADDEN, *Assistant Examiner.*